(12) United States Patent
Howard

(10) Patent No.: US 6,747,632 B2
(45) Date of Patent: Jun. 8, 2004

(54) WIRELESS CONTROL DEVICE

(75) Inventor: Robert Bruce Howard, Manassas, VA (US)

(73) Assignee: Harmonic Research, Inc., Sudley Springs, VA (US)

( * ) Notice: Subject to any disclaimer, the term of this patent is extended or adjusted under 35 U.S.C. 154(b) by 391 days.

(21) Appl. No.: 09/947,564

(22) Filed: Sep. 7, 2001

(65) Prior Publication Data

US 2002/0024500 A1 Feb. 28, 2002

(51) Int. Cl.[7] .................................................. G09G 5/08
(52) U.S. Cl. ....................................... 345/158; 345/157
(58) Field of Search ............................... 345/156, 157, 345/158, 163, 161, 856, 863

(56) References Cited

U.S. PATENT DOCUMENTS

| | | | |
|---|---|---|---|
| 4,542,291 A | | 9/1985 | Zimmermann |
| 4,988,981 A | * | 1/1991 | Zimmerman et al. ........ 345/158 |
| 5,616,078 A | * | 4/1997 | Oh ................................. 463/8 |
| 5,737,505 A | * | 4/1998 | Shaw et al. ................. 345/419 |
| 5,844,824 A | * | 12/1998 | Newman et al. ............ 345/156 |
| 5,913,727 A | * | 6/1999 | Ahdoot ......................... 463/39 |
| 5,914,701 A | * | 6/1999 | Gersheneld et al. ........ 345/156 |
| 6,005,548 A | * | 12/1999 | Latypov et al. ............. 345/156 |
| 6,094,188 A | * | 7/2000 | Horton et al. ............... 345/158 |
| 6,097,369 A | * | 8/2000 | Wambach .................... 345/158 |
| 6,097,374 A | | 8/2000 | Howard |
| 6,127,990 A | * | 10/2000 | Zwern ............................ 345/8 |
| 6,222,523 B1 | * | 4/2001 | Harvill et al. .............. 345/156 |

\* cited by examiner

*Primary Examiner*—Kent Chang
(74) *Attorney, Agent, or Firm*—Greenberg Traurig, LLP; Paul F. McQuade

(57) ABSTRACT

A wireless control device includes a small, lightweight housing worn by an operator, for example on the operator's wrist, and a controlled device, for example a personal computer. Several optical emitters, preferably light emitting diodes operating in the infrared range, and several optical detectors are provided on the housing. At least one x-axis emitter-detector pair operates to detect an x-direction of a pointing motion or gesture, and at least one y-axis emitter-detector pair operates to detect a y-direction of a pointing motion or gesture. This motion can then be used to cause a response in the controlled device. For example, angles of the operator's hand at the wrist can be interpreted to induce motion of a cursor on a computer display. The device may also include a motion sensor, an environmental condition sensor, or a voice recognition sensor, and can also be adapted for gesture recognition and image scanning applications.

25 Claims, 5 Drawing Sheets

WIRELESS CONTROL DEVICE

CROSS-REFERENCE TO RELATED APPLICATIONS

This application is related to U.S. patent application Ser. No. 09/035,983, filed Mar. 6, 1998, now U.S. Patent No. 6,097,374, claiming priority of U.S. Provisional Patent Application Serial No. 60/040,502 Mar. 6, 1997, and U.S. patent application Ser. No. 09/689,659, filed Oct. 13, 2000, claiming priority of U.S. Provisional Patent Application Serial No. 60/159,611 Oct. 15, 1999, claiming which are hereby fully incorporated by reference.

This application claims priority under 35 U.S.C. §120 of U. S. patent application Ser. No. 09/689,659, filed Oct. 13, 2000, which itself claims priority of U. S. Provisional Patent Application Serial No. 60/159,611.

BACKGROUND OF THE INVENTION

1. Field of the Invention

The present invention generally relates to portable selective data capture and selective control devices providing an interface between a user and a controlled device and, more particularly, to arrangements for providing data or control input to devices such as a data processor, musical instrument, communication device or the like while allowing freedom of movement and minimal interference with other activities for a user.

2. Background Description

Most mechanical and electrical devices capable of multiple functions require and provide for user control for selection between those functions and initiation and termination of the function selected. In general, multiple buttons in the nature of a keypad or keyboard of arbitrary extent has been the arrangement of choice for communicating user selection and/or control to the device. In recent years, other arrangements such as pointing devices and voice-responsive systems have come into relatively widespread use. Further, some systems have provided for control and/or selection to be provided by collected data such as physiological information concerning the user. For example, eye movement or nervous system activity (e.g. EEG, EKG, blood pressure, electroneural muscle activity and the like) can be monitored to develop signals which can be used in the same manner as key strokes for selection or control. However, alternative input arrangements have generally been implemented as stand-alone systems which are useable alone or as a supplement to keyboards in a mutually exclusive fashion.

However, keyboards are not generally well-adapted for long periods of operation by a human user and alternative arrangements such as those alluded to above generally involve some degree of inconvenience, slow response, substantial user training and accommodation and/or significant data processing resources. So-called ergonomic design features provide only marginal improvements in accommodating human use. Moreover, while some portable or wearable devices are known, they are generally dedicated to a single type of input to a single apparatus, such as the separate keyboard and mouse or other pointing arrangement of a personal computer. For example, an arrangement is known in which a rolling member such as is used in a mouse is mounted on the underside of a keyboard and pointing controlled by sliding the entire keyboard along a surface, compromising convenience of both pointing and data entry functions.

A notable exception is disclosed in the above-incorporated U. S. Pat. No. 6,097,374 granted to the inventor of the present invention. As disclosed therein, a small and lightweight housing is preferably worn on the wrist and includes a plurality of directional light-emitting devices. The housing supports a substantially linear array of directional light receptors extending generally parallel to the direction of light emission and receives light substantially orthogonal thereto; thus providing a matrix of locations which can be monitored and distinguished from each other when a finger or other appendage is moved to any location in the matrix defined by the directional light emitters and receptors.

This arrangement also includes motion sensors in at least two directions for controlling a pointing device in response to hand motion (e.g. orientation, velocity and the like) for controlling a pointing arrangement or providing other input parameters such as volume or tempo to a musical instrument digital interface (MIDI) and, if desired, a microphone and associated circuitry for receiving voice or other audible signal input. All information developed by these arrangements is communicated to another device or base station such as a personal computer or musical instrument by a modulated light or radio wave communication link much in the nature of a remote control arrangement for a television or other appliance.

However, even this related device, like other existing devices, is inherently limited in its capabilities. For example, the use of motion sensors such as accelerometers or gyroscopes to track hand motion in a pointing application requires broad, exaggerated hand motions in order to control the cursor. Consequently, the hand must be supported by the arm to facilitate the range of motion required for the pointing application. This can become extremely uncomfortable and tiring to the user. Furthermore, it does not provide the fine sense of cursor control that one would attain by using a conventional computer mouse. Additionally, existing devices are generally limited to character-level data entry, and this data entry is extremely sensitive to hand orientation. This further restricts the usefulness of existing devices.

SUMMARY OF THE INVENTION

It is therefore an object of the present invention to provide enhancements for the invention disclosed and claimed in the above-incorporated U.S. Pat. No. 6,097,379 in structure, information capture, function, and adaptability to a greatly increased variety of applications.

It is another object of the invention to provide the function of the invention of U.S. Pat. No. 6,097,379 and additional functions with increased accommodation of other activities of a user.

It is still another object of the present invention to provide a wireless control device that will allow the user to comfortably and precisely control a pointing application.

A further object of the present invention is to provide a wireless control device capable of detecting and interpreting gestures performed by the user.

Yet another object of the present invention is to provide a wireless control device capable of receiving input independent of the position of the user or of a part of the user's body.

Yet another object of the present invention is to provide an input device capable of intrinsically sterile and safe operation.

Still another object of the present invention is to provide an input device capable of detecting additional degrees of freedom and corresponding additional types of input information.

In order to accomplish these and other objects of the invention, there is provided a small, lightweight housing worn by an operator and a controlled device, for example a personal computer. Several optical emitters, preferably light emitting diodes operating in the infrared range, and several optical detectors are provided on the housing. The emitters and detectors can be provided in a single plane for go/no-go operation of the device. Alternatively, the emitters and detectors can be disposed in two planes on the housing so that the device can resolve hand position and orientation instead of only key closures and motion or orientation of the device. At least one x-axis emitter-detector pair operates to detect an x-direction of a pointing motion or gesture, and at least one y-axis emitter-detector pair operates to detect a y-direction of a pointing motion or gesture. In the preferred embodiment of the invention, the housing is worn on the operator's wrist and the emitter-detector pairs detect the angle of the operator's hand at the wrist. This motion can then be used to cause a response in the controlled device. For example, the pointing motion or gesture can correspond to the movement of a cursor on a computer display as if the operator were using a conventional computer mouse. This optical pointing embodiment can operate in either a joystick-like fashion or a mouse-like pointing stroke fashion. The housing may also optionally include a motion detector, such as an accelerometer or gyroscope, an environmental condition sensor, or a voice recognition sensor.

The present invention can also be used for gesture recognition, for example by combining time domain analysis of hand positions and orientations with image recognition capabilities. Hand motions can be resolved into a series of hand images over time, which can then be correlated with a pre-programmed library of gestures, such as gestures stored as images in a content-addressable memory functioning as a lookup table. Gesture recognition allows the present invention to be used not only for character-level data entry, but also for word- and phrase-level data entry. Furthermore, the gesture recognition can be made context sensitive so that the same gesture performed in different contexts leads to a different response by the same controlled device, or even to a response in an entirely different controlled device. Gesture recognition capabilities can also be used to implement a demand mode whereby the device can be switched on and off as the user desires.

It is also contemplated to employ the present invention to scan images in two or three dimensions. This overscanning feature can be used to cause the device to learn and adapt to the particular physiological geometries of the user rather than requiring the user to adapt to the device's physical characteristics. It can also be used to scan objects of interest other than parts of the user's body for real-time or archival use.

Since the device allows data entry and cursor control without any contact with a physical device, the present invention is well suited to use in sterile environments. Furthermore, the absence of mechanical interaction eliminates the possibility of sparking and makes the present invention suitable for use in combustible environments. Additionally, the device avoids the development of certain medical conditions, such as carpal tunnel syndrome or repetitive stress injuries, and can be adapted for use by those with various physical handicaps.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
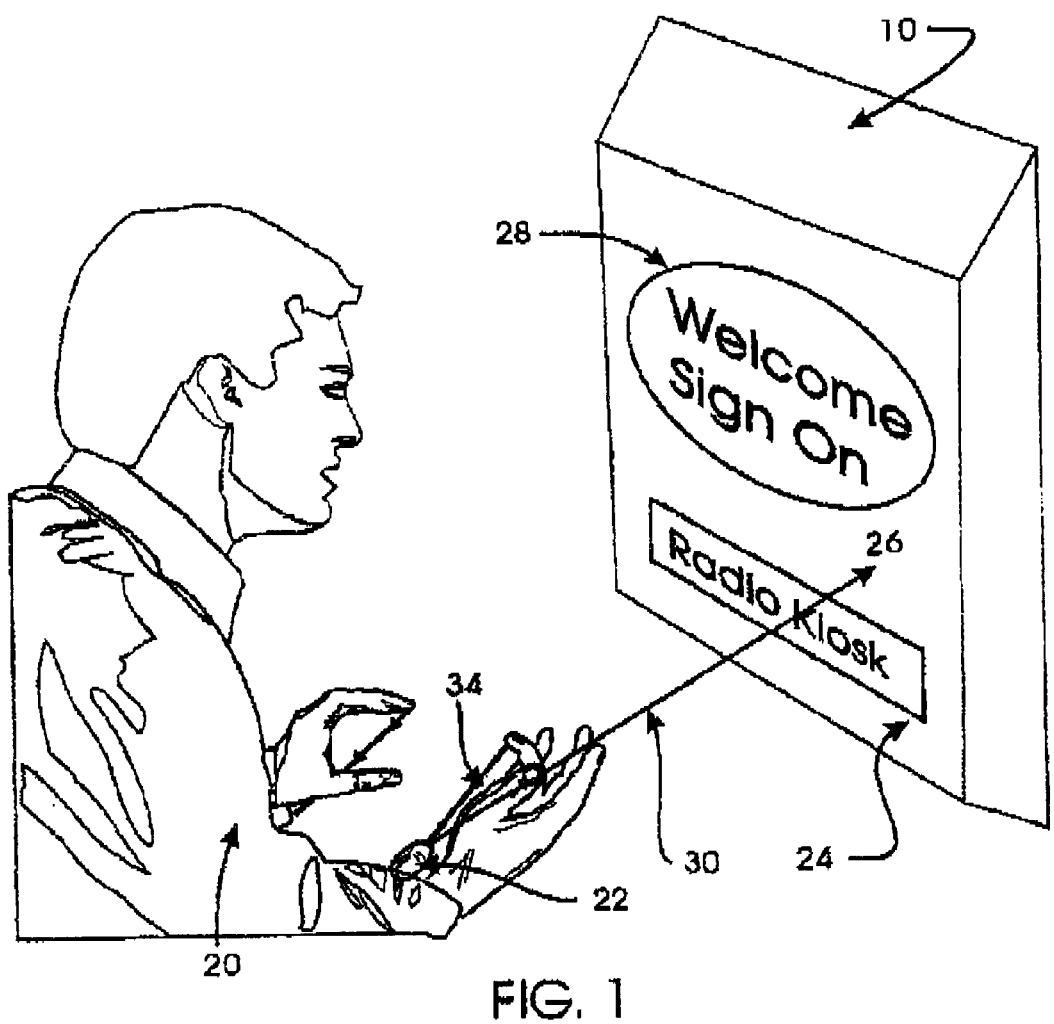
FIG. 1 is an illustrative application of the invention.
Figure 2:
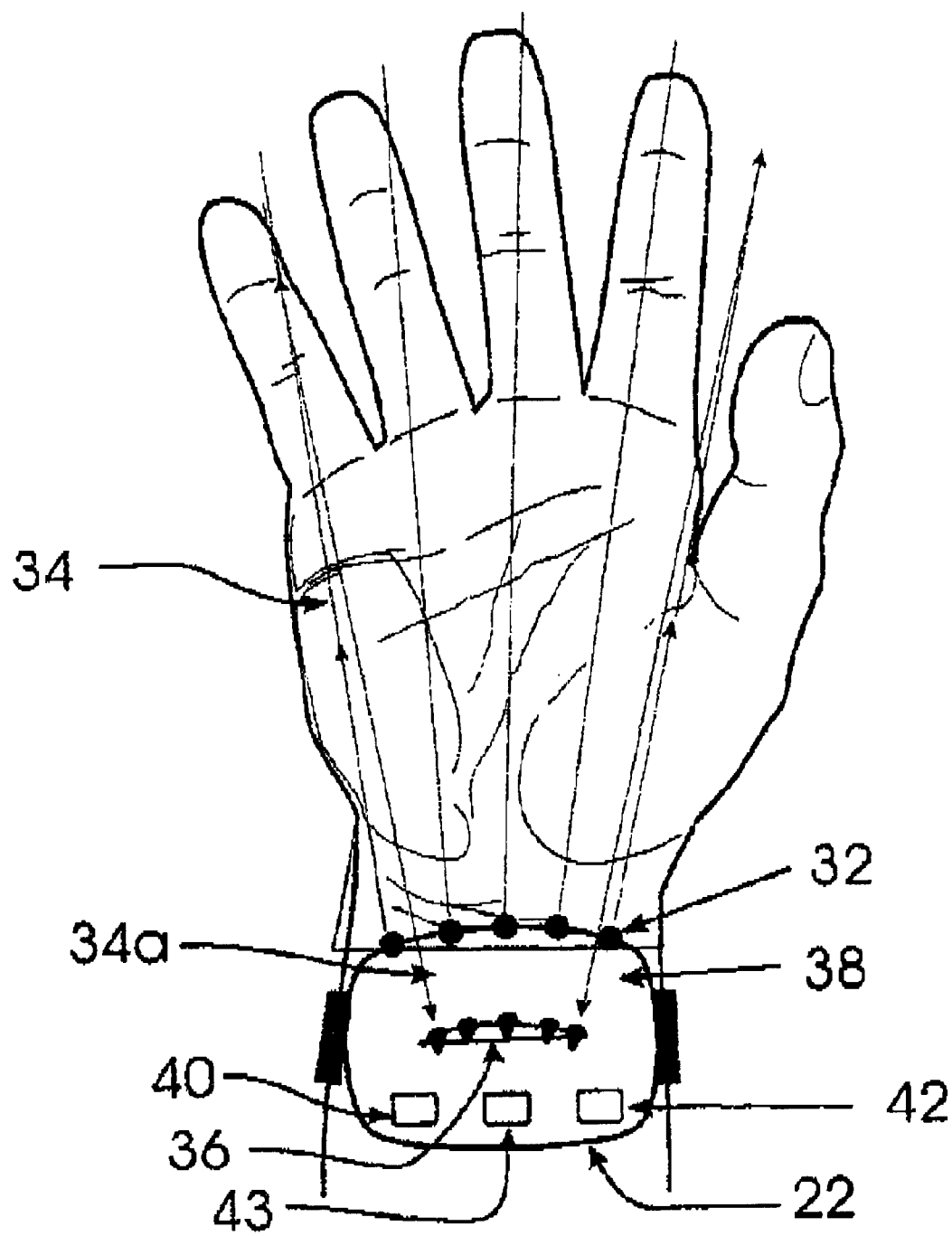
FIG. 2 illustrates some principal elements of the invention.

Referring now to the drawings, and more particularly to FIGS. 1 and 2, there is shown an exemplary and generalized application of the improved wireless control device 10. An operator 20 wears a small, lightweight housing 22 on at least one wrist or other convenient location on the body. The wrist is preferred as being proximate to the fingers which would ordinarily be used to operate a keyboard. However the invention may be adapted freely in accordance with its basic principles of operation as desired to accommodate the operator as a manner of convenience, physical handicap, or the like. A controlled device 24 is provided and includes a sensor 26 for light or any other form of energy suitable for transmission of a coded signal. Controlled device 24, hereinafter referred to as a base station for generality, preferably also includes a transducer 28, such as a display or an audio annunciator such as a beeper or speech synthesizer, to confirm receipt of a coded signal 30 and recognition of its content. Alternatively, annunciation could be in housing 22 and could respond to a light signal from base unit 24 (e.g. housing 22 could emit a beep when a signal is received).

As shown generally in FIG. 2 and explained in greater detail in the above-referenced related patents and applications, light emitters 32 on housing 22, which are preferably light emitting diodes ("LEDs") operating in the infrared range, project well-defined beams of energy 34 over a limited solid angle generally parallel to the palm of the operator's hand. The solid angle of the beams is preferably limited such that the illuminated regions will not overlap at a distance from housing 22 that is closer than the fingertips of the operator. Thus, movement of the operator's hand, such as movement of a finger in a motion similar to pressing a key on a keyboard, will cause the tip of the operator's finger to be illuminated by a beam 34. This illumination is reflected 34a from the operator's fingertip and detected by a detector 36, also on housing 22. Thus, by correlation of reflected beams of light 34a with emitted beams of light 34, the placement of any finger or other object can be not only detected but also differentiated from any other location, and an appropriate coded signal 30 can be sent from housing 22 to base station 24. Coded signal 30 can be sent by one of light emitters 32 or by a separate signal emitter 38.

While it is preferred, for simplicity, to energize light emitters 32 in succession in a time-multiplexed fashion, it will be recognized by one skilled in the art that reflected beams 34a can be distinguished by other expedients such as frequency modulation or pulse width coding. Depending upon the intended use of device 10, housing 22 may optionally include a motion sensor 40, such as an accelerometer or gyroscope, for detecting motion of a body part of operator 20 in space, and an environmental condition sensor 42. Environmental condition sensor 42 can be adapted to measure any number of environmental or physiological conditions, including, but not limited to, blood pressure, humidity, temperature, and air pressure, as required by particular applications of device 10. A voice recognition sensor 43 may also be provided.

Figure 3:
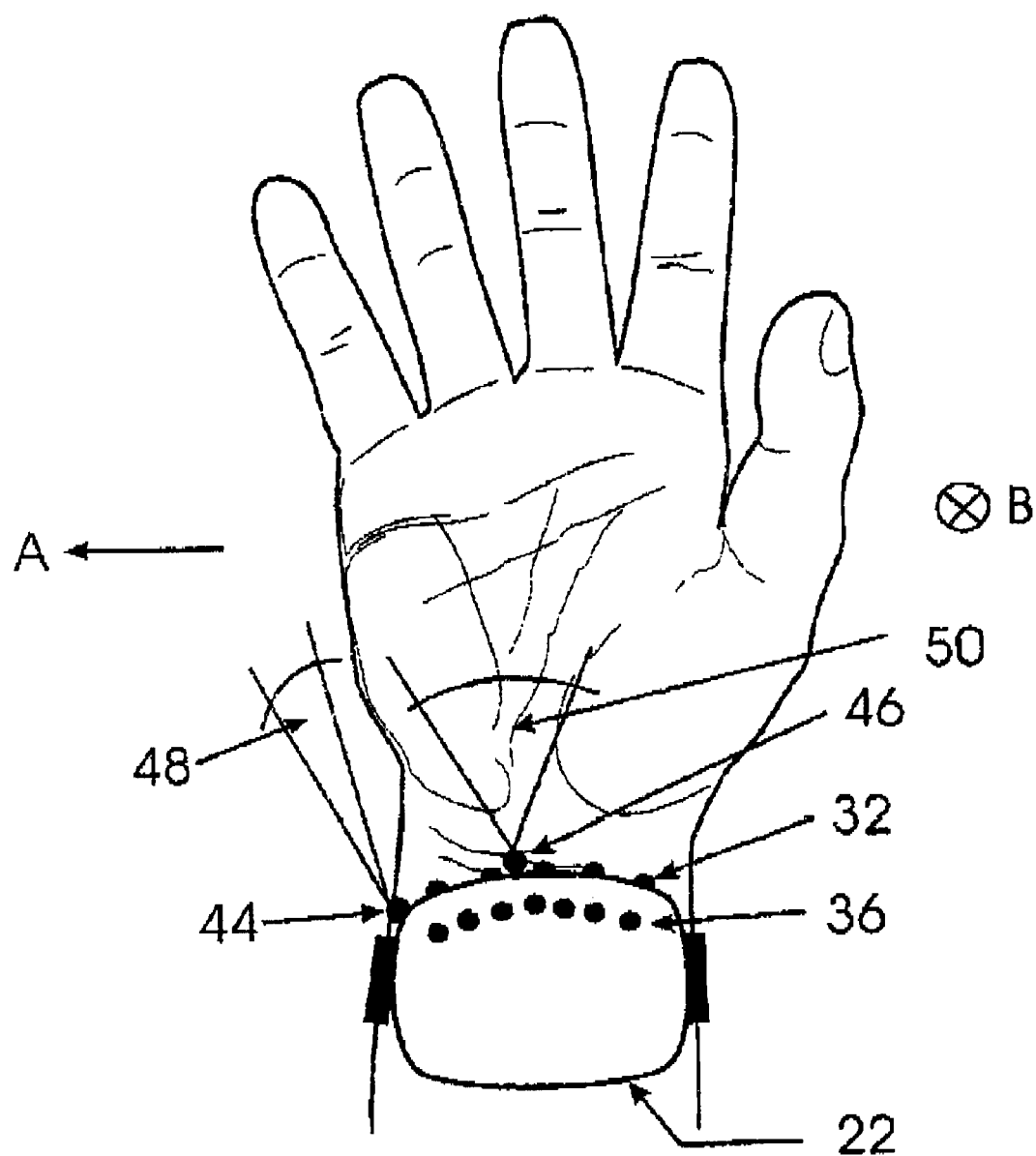
FIG. 3 illustrates the embodiment of the invention used for optical pointing.

FIG. 3 illustrates an embodiment of device 10 adapted for optical pointing, such as for movement of a cursor on a computer screen, much like the manner of the mouse familiar to personal computer users (that is, based on the angle of the hand at the wrist). However, one skilled in the art will appreciate that the optical pointing applications of the present invention are not limited to cursor pointing. At least one x-axis emitter-detector pair 44 and at least one y-axis emitter-detector pair 46 are provided on housing 22. The emitter in x-axis emitter-detector pair 44 is oriented to illuminate the knife edge of the hand (that is, the edge of the hand opposite the pinky finger) in fan shaped x-axis beam 48.

Similarly, the emitter in y-axis emitter-detector pair 46 is oriented so as to illuminate the heel of the hand in fan shaped y-axis beam 50. The use of fan shaped beams 48 and 50 reduces the effects of perpendicular motion of the hand surface on the measurement of wrist angles as described below. This illumination is reflected from the hand and back towards the detectors of emitter-detector pairs 44 and 46: light reflected off the knife edge of the hand is detected by the detector in x-axis pair 44, while light reflected by the heel of the hand is detected by the detector in y-axis pair 46. Device 10 then interprets the magnitude of reflected beams 48 and 50 as a particular hand position in the above-described fashion, and can initiate corresponding cursor movement accordingly.

The angle of the hand at the wrist determines the magnitude of the reflection of beams 48 and 50 detected by the detectors of pairs 44 and 46, respectively, and the magnitude detected in turn determines the direction and duration of the responsive cursor motion. For example, when operator 20 angles his hand outward at the wrist (that is, in the direction of arrow a, decreasing the angle between the pinky finger and the forearm), the magnitude of the reflection detected by x-axis pair 44 increases, and a corresponding motion of the cursor in the x-direction occurs. Similarly, when operator 20 angles his hand upward at the wrist (that is, into the plane of the paper in the direction of arrow b, decreasing the angle between the back of the hand and the forearm), the magnitude of the reflection detected by y-axis pair 46 decreases, causing a corresponding movement of the cursor in the y-direction.

A variety of methods can be employed to eliminate unintentional movement of the cursor while device 10 is in use. For example, the magnitude of the reflected beams 48 and 50 is time-averaged in order to reduce background noise such as inadvertent, minor movements of the hand. Additionally, a threshold can be set in the x-, y-, and z-directions, below which no motion is passed to the cursor, further reducing the likelihood that the cursor will respond to minor movements of the hand. Audio or voice actuation, or a particular arm movement (e.g. as if reaching for a mouse) could be employed alternatively or in combination to employ the demand mode discussed below. Proper responses to particular movements or gestures can be developed by using any adaptive arrangement as will be familiar to one skilled in the art.

Correlation techniques are used to yield consistent results while measuring amplitude while rejecting ambient interference and system noise. For example, susceptibility to harmonic interference, such as flourescent lamps, can be reduced, for example, by using a pseudo-random sequence to drive the active LED emitter being scanned and to decode the magnitude of the reflected light, determining the average "on" amplitude versus the average "off" amplitude.

By utilizing optical emitter-detector pairs 44 and 46 to detect movement of the hand instead of accelerometers or gyroscopes to detect arm motion, the present invention achieves many advantages over existing devices. For example, broad, exaggerated hand movements are no longer necessary to induce cursor motion on the computer screen, as optical pointing gives the user a finer sense of control by making cursor motion sensitive to the angle of the hand at the wrist. Accordingly, the present invention can be utilized with the forearm in a resting position rather than being used to support the hand in space. This is not only less fatiguing and more convenient for the user, but also gives the user much more precise control over the cursor, as would be the case with a conventional computer mouse, while allowing motion sensors, if included, to provide additional input data for any desired purpose. Precision is further enhanced by the fact that optical emitter-detector pairs 44 and 46 are not sensitive to the Earth's gravity, and consequently elevation, as accelerometers and gyroscopes are. Furthermore, the optical pointing embodiment of the present invention is significantly less expensive than existing devices utilizing accelerometers or gyroscopes. However, one skilled in the art will recognize that, in those applications where it is desirable to track whole-hand motion rather than just the angle of the hand at the wrist, accelerometers or gyroscopes can be used in conjunction with the optical pointing embodiment of the current invention to achieve even greater versatility as alluded to above.

As described above, the optical pointing embodiment of the present invention operates in a joystick-like mode. That is, the hand has a home position, and deviation from the home position in the x- or y-direction starts a corresponding motion of the cursor that will not cease until the hand is returned to the home position. While the hand does have a naturally comfortable home position, this joystick-like optical pointing method is inherently demanding on the user, as it requires accurate timing and precise actions to ensure that the mouse cursor comes to rest at the desired point on the computer screen.

Accordingly, the present invention can also be adapted to operate in a mouse-like fashion by generating pointing strokes. Pointing stroke operation converts the motion vectors generated by deflection from any random rest position of the hand to any desired ending position of the hand into a stroke of cursor motion on the computer screen. For example, assume that the user's hand is in the position shown in FIG. 2, which may or may not correspond to the home position described above, at a time $t_1$. Further suppose that the user then deflects his hand in the direction of arrow a into a different position at time $t_2$. Device 10 resolves the respective magnitudes of reflected beam 48 at times $t_1$ and $t_2$ into hand positions at times $t_1$ and $t_2$ as described above, and then into a motion vector for the hand from time $t_1$ to time $t_2$. The motion vector is then resolved into a corresponding stroke of motion that decays to zero at the ending position rather than continuing until the hand is returned to the home position, and causes a cursor motion on the computer screen that mimics the hand motion from time $t_1$ to time $t_2$, as though a finger or stylus in the hand were directing the motion of the cursor on the screen. That is, the cursor will move in the direction corresponding to the direction of hand deflection by an amount corresponding to the amount of hand deflection and will then stop. Once calibrated to an individual user, pointing stroke operation offers an even more direct and comfortable sense of control over cursor motion.

Pointing stroke operation can be made even more practical with the "demand mode" described below. For example, while the joystick-like pointing mode described above allows for unlimited movement of the cursor in any direction by simply holding one's hand in a deflected position, one skilled in the art will recognize that pointing stroke operation is limited to the range of motion of the user's hand. Demand mode will allow the user to generate a pointing stroke in a particular direction, switch optical pointing off, return his hand to a more comfortable or neutral position, switch optical pointing back on, and generate a second stroke in the same direction. This is analogous to lifting a computer mouse from its rolling surface to re-center it in a more comfortable or useful position to effectively increase the size of the rolling surface.

Figure 4:
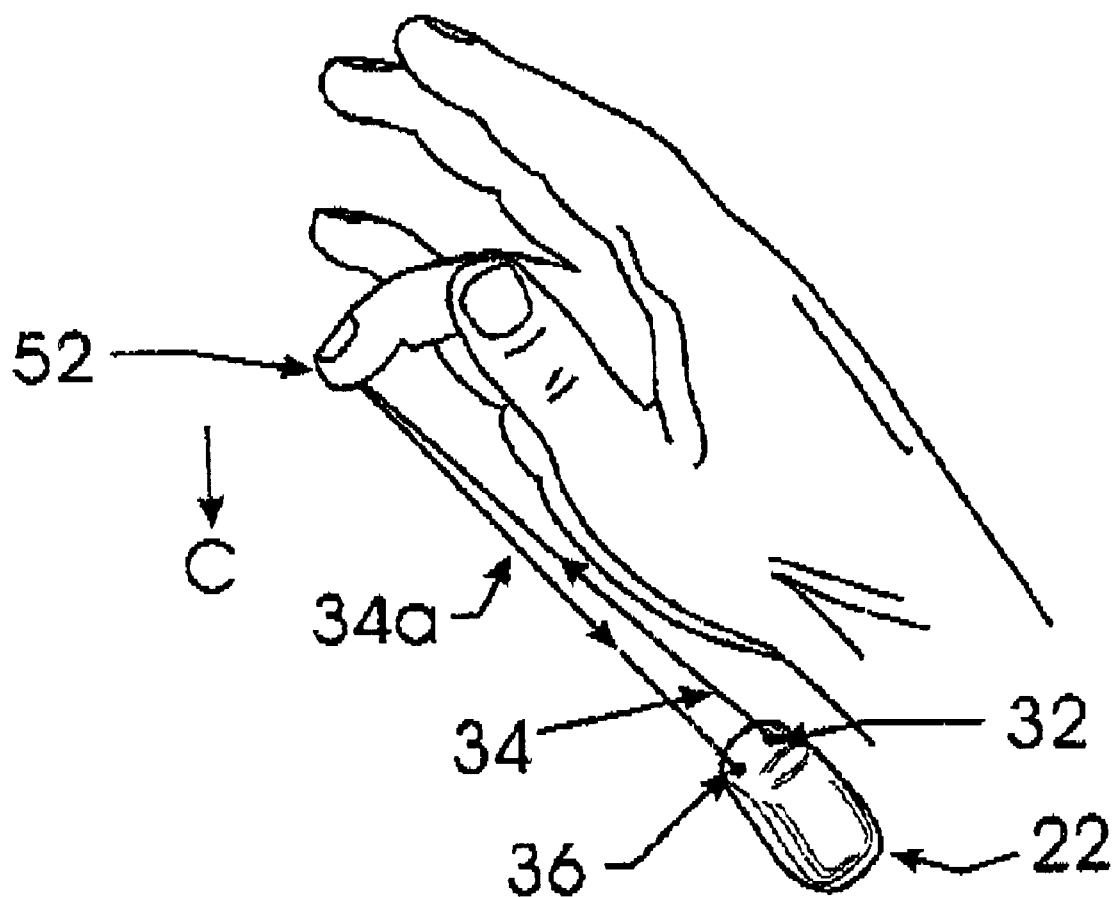
FIG. 4 illustrates the use of the invention for gesture recognition.

The present invention can also be used for gesture recognition by combining time domain analysis of hand and finger positions and orientations with image recognition capabilities. The method by which device 10 recognizes gestures is substantially similar to the method described above for mouse-like pointing stroke operation. For example, suppose that the user's fingers are in the position illustrated by FIG. 4 at time $t_1$. Emitter 32 emits beam 34, which is reflected by a fingertip 52. Detector 36 then detects reflected beam 34a and, in the manner described above, device 10 determines the position and orientation of the finger at time $t_1$. Suppose that the user then deflects his finger downwards in the direction of arrow c so that fingertip 52 is in a new location at time $t_2$. Once again using the method described above, device 10 resolves the position and orientation of the finger at time $t_2$. The user may then return his finger to the original position and orientation or move it into an entirely new position and orientation at time $t_3$ for device 10 to resolve, and so on.

These resolutions of finger position and orientation over time are then compiled and correlated with a pre-programmed library of gesture images such as those stored in a content-addressable memory functioning as a lookup table, and device 10 is able to recognize the gesture made--in the above example, a "finger-wagging" gesture. The pre-programmed library of gestures may include standardized gestures (e.g. American Sign Language gestures) as well as user-specific gestures captured and recorded during a machine-training phase (e.g. the finger-wagging described above). Gestures captured and recorded during a machine-training phase will inherently be programmed to the user's specific hand size, shape, and motion sets.

Gesture recognition capabilities can be made even more powerful by coupling the resolution of hand positions and orientations as described above with the resolution of hand motion. Hand motion can be resolved by using the optical pointing embodiment described above, or, where tracking of whole-hand motion is desired, by including gyroscopes, accelerometers, or other motion sensors 40 or environmental sensors 42 in device 10. By combining time-domain analysis of hand positions and orientations with time-domain analysis of hand motion, numerous image recognition processes are available for application in decoding gestures.

The gesture recognition method described above allows the present invention to be used not only for character-level entry of data (such as keyboard typing or telephone dialing), but also for word- and phrase-level entry of data (such as that employed by American Sign Language). For example, the gesture recognition embodiment of the present invention can be used to transcribe or annunciate, in real time, American Sign Language communications. Furthermore, inflection may be added to the transcription or annunciation of gestures based on the height above the ground at which the gesture is performed: a lower position could signify a lower inflection tone, while a higher position indicates greater emphasis or higher inflection.

Gesture recognition methods may also be made context-sensitive so that the same gesture may have many different effects depending upon the context in which it is performed. For example, the finger-wagging gesture described above could be used to answer a ringing telephone in one context and toggle a light switch in another context. As another example, raising or lowering one's arm may control radio volume in one context and ambient lighting brightness in another. The user may select between contexts in any number of ways. For example, where housing 22 includes a voice recognition sensor 43, the user may speak the desired context (e.g. "radio" when gestures are intended to control the radio and "lights" when gestures are intended to control the lights). However, other methods of selecting context are within the scope of this invention.

Gesture recognition can also be used to implement the demand mode mentioned above for mouse-like optical pointing. By programming a particular gesture or gestures to activate and deactivate device 10, the user can turn any given operational mode, or the entire device, on and off as required or desired. Demand mode can also be employed to activate and deactivate combination modes or contexts.

Figure 5:
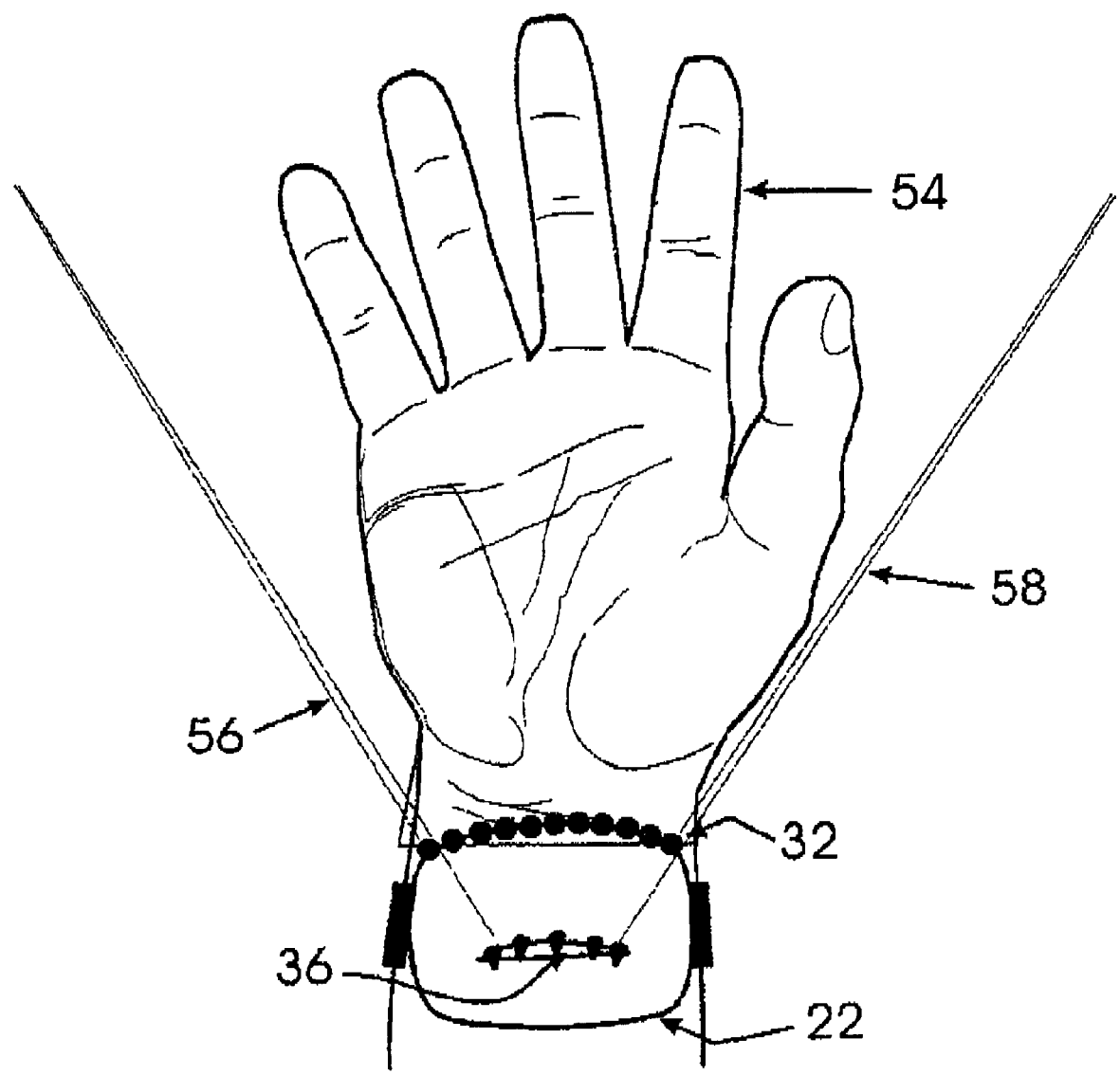
FIG. 5 illustrates the tracking optics embodiment of the invention.

Another feature that can be added to the present invention is the optical tracking, or "overscanning," feature illustrated in FIG. 5. This feature ensures that a particular digit is always correctly identified by device 10. For example, optical tracking will ensure that index finger 54 is always recognized as index finger 54 regardless of hand orientation or position.

Overscanning is accomplished by beginning a scan at one extreme 56 of the hand's deviation in one direction and terminating the scan at the opposite extreme position 58. Overscanning may be done with many discrete emitters 32 and detectors 36, or by raster scanning. Where many discrete emitters 32 and detectors 36 are utilized, overscanning is accomplished by employing more emitters 32 and detectors 36 than necessary to resolve individual fingers or by beginning and ending a continuously scanned source outside the rest-position extremes 56 and 58 of the hand's perimeter. Overscanning may also be implemented by incorporating a physically movable optical member, such as a rotating or pivoting mirror, or electrically steerable optical member into housing 22. In this latter embodiment, emitter 32 and detector 36 move in tandem to scan the region, allowing a single electronic receiver circuit to scan the desired region. It will be apparent to one skilled in the art that the above methods can easily be extended into the third dimension for full active imaging.

Once the overscan is complete, the optical pointing vector generated by tracking the hand's angle relative to the wrist as described above and illustrated in FIG. 3 is used to calculate the hand's offset within the scanned region. Device 10 can thereby determine which finger has been moved into the path of an emitted beam of light. Since this feature allows the present invention to learn the user's hand geometry rather than requiring the user to accommodate to the invention's characteristics, user interaction with device 10 is greatly simplified. For example, the optical tracking feature allows device 10 to be used simultaneously for both mouse control and keyboard typing, whereas the keyboard typing features of a device without the optical tracking feature would easily become "confused" when the hand was deflected to move the mouse cursor.

Three dimensional scans of the user's hand may also provide input images for gesture recognition as described above. Alternatively, directing the emitters 32 and detectors 36 towards an arbitrary nearby surface instead of the user's hand can be used to provide real-time imaging of an object of interest other than the user's hand. For example, device 10 can be used to actively capture images of objects for interpretation by system software or, by employing optical character recognition, to read and annunciate text in order to assist visually impaired users. As another example, a doctor could direct the emitters 32 to capture an image of a patient during an operation for real time or archival use, enter notes into a computerized log using device 10, and continue with the operation without re-scrubbing as would be required if a camera were used or physical keys were struck.

Housing 22 may also include a second plane of emitters 32 and detectors 36 in order to resolve hand position in two dimensions. The first dimension is resolved as the finger passes through the first plane of emitters 32 and detectors 36, while the second dimension is resolved once the finger passes entirely through the first plane and into the second. This enhances the go/no-go nature of existing wearable computer devices to allow for resolution of hand position and orientation instead of merely detecting key closures. Alternatively, device 10 could illuminate each finger from several different angles and use parallax to resolve hand position in two dimensions, though the former method is preferred to the latter.

The present invention is capable of intrinsically safe and sterile operation. As described above, the present invention allows data entry and cursor control without any contact with a physical device. Accordingly, device 10 is well-suited to use in sterile environments, such as operating rooms. Device 10 can also be used in highly combustible environments because the absence of mechanical interaction eliminates the possibility of sparking that could ignite the environment.

As can be seen from the foregoing, the present invention creates a concert of input information having many degrees of freedom at any instant and which can be sampled over time. The present invention thereby provides a sense of control that is presently unavailable. For example, the device is capable of detecting finger position and orientation, individually, in combination, and relative to each other, such as in turning a knob, the distance between the operator's fingertip and wrist, the angle of the hand at the wrist in the x- and y-directions, arm position in the x-, y-, and z-directions, arm pitch, roll, and yaw, environmental and physiological conditions, voice input, two dimensional image inputs, such as bar code readings, three dimensional image inputs, and numerous other types of input. With this many types of input data, only a very few time-related data sets are necessary to implement the above-described applications effectively, as additional data makes it easier to distinguish "signatures" associated with, for example, a particular gesture. Furthermore, by carefully selecting the data compiled to produce a result, the device may be used for character-level input, such as a computer keyboard, combinatorial-level input, such as a stenographic keyboard, word- or phrase-level input, such as American Sign Language, joystick control, mouse control, pitch or tone control, control over environmental settings (e.g. thermostats, dimmer switches, television or stereo volume controls), and many others.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. A wireless control device, comprising:
   a base station including a sensor;
   a housing worn on a body of an operator, said housing including a plurality of optical emitters and a plurality of optical detectors;
   at least one optical emitter and at least one optical detector forming at least one x-axis emitter-detector pair for detecting an x-direction of a pointing motion or gesture;
   at least one optical emitter and at least one optical detector forming at least one y-axis emitter-detector pair for detecting a y-direction of a pointing motion or gesture; and,
   means for distinguishing between optical beams emitted from said plurality of optical emitters when reflected from a body part of the operator or another object and detected by said optical detectors.

2. The wireless control device according to claim 1, wherein said optical emitters are light emitting diodes and said optical beams are beams of infrared light.

3. The wireless control device according to claim 1, wherein said x- and y-axis emitter-detector pairs detect motion of the body part adjacent to a body part on which said housing is worn.

4. The wireless control device according to claim 3, wherein said housing is worn on a wrist of the operator and said x- and y-axis emitter-detector pairs detect motion of a hand of the operator.

5. The wireless control device according to claim 4, wherein said emitters in said at least one x-axis emitter-detector pair illuminate a knife edge of the hand of the operator, said detectors in said at least one x-axis emitter-detector pair detect beams reflected from the knife edge of the hand of the operator, said emitters in said at least one y-axis emitter-detector pair illuminate a heel of the hand of the operator, and said detectors in said at least one y-axis emitter-detector pair detect beams reflected from the heel of the hand of the operator.

6. The wireless control device according to claim 5, wherein said emitters illuminate the knife edge and the heel of the hand of the operator in fan shaped beams.

7. The wireless control device according to claim 1, wherein said housing further comprises an environmental condition sensor.

8. The wireless control device according to claim 1, wherein said housing further comprises a voice recognition sensor.

9. The wireless control device according to claim 1, wherein said x- and y-directions of said pointing motions or gestures correspond to x- and y-axis movement of a cursor on a display.

10. The wireless control device according to claim 1, wherein said x- and y-axis emitter-detector pairs detect said x- and y-directions of said pointing motion or gesture in a joystick-like fashion.

11. The wireless control device according to claim 1, further comprising means for resolving at least one of position, orientation, and motion of the body part of the operator over time.

12. The wireless control device according to claim 11, wherein said x- and y-axis emitter-detector pairs detect said x- and y-directions of said pointing motion or gesture in a mouse-like fashion.

13. The wireless control device according to claim 11, wherein said means for resolving motion of the body part of the operator over time is an accelerometer or a gyroscope.

14. The wireless control device according to claim 11, further comprising means for recognizing a plurality of gestures performed by the operator.

15. The wireless control device according to claim 14, wherein said gestures include American Sign Language gestures, Native American Sign Language gestures, or gestures comprising any other gesture-based method of communication.

16. The wireless control device according to claim 14, wherein said means for recognizing a plurality of gestures is context-sensitive.

17. The wireless control device according to claim 1, further comprising demand means for toggling said device between an on state and an off state.

18. The wireless control device according to claim 1, further comprising scanning means for identifying an object.

19. The wireless control device according to claim 18, wherein the object is the body part of the operator.

20. The wireless control device according to claim 19, wherein said scanning means starts a scan at one extreme of motion of the body part of the operator and ends said scan at an opposite extreme of motion of the body part of the operator.

21. The wireless control device according to claim 18, wherein said scanning means further comprises a physically movable optical member.

22. The wireless control device according to claim 21, wherein said physically movable optical member further comprises a rotating or pivoting member.

23. The wireless control device according to claim 21, wherein said physically movable optical member further comprises at least one electrically steerable emitter-detector pair.

24. The wireless control device according to claim 18, wherein said scanning means scans the object in three dimensions.

25. The wireless control device according to claim 1, wherein said optical emitters and said optical detectors are disposed on said housing in two planes.

* * * * *